E. S. SCRIPTURE.
Attaching Hubs to Axles.
No. 7,535            Patented July 30, 1850.
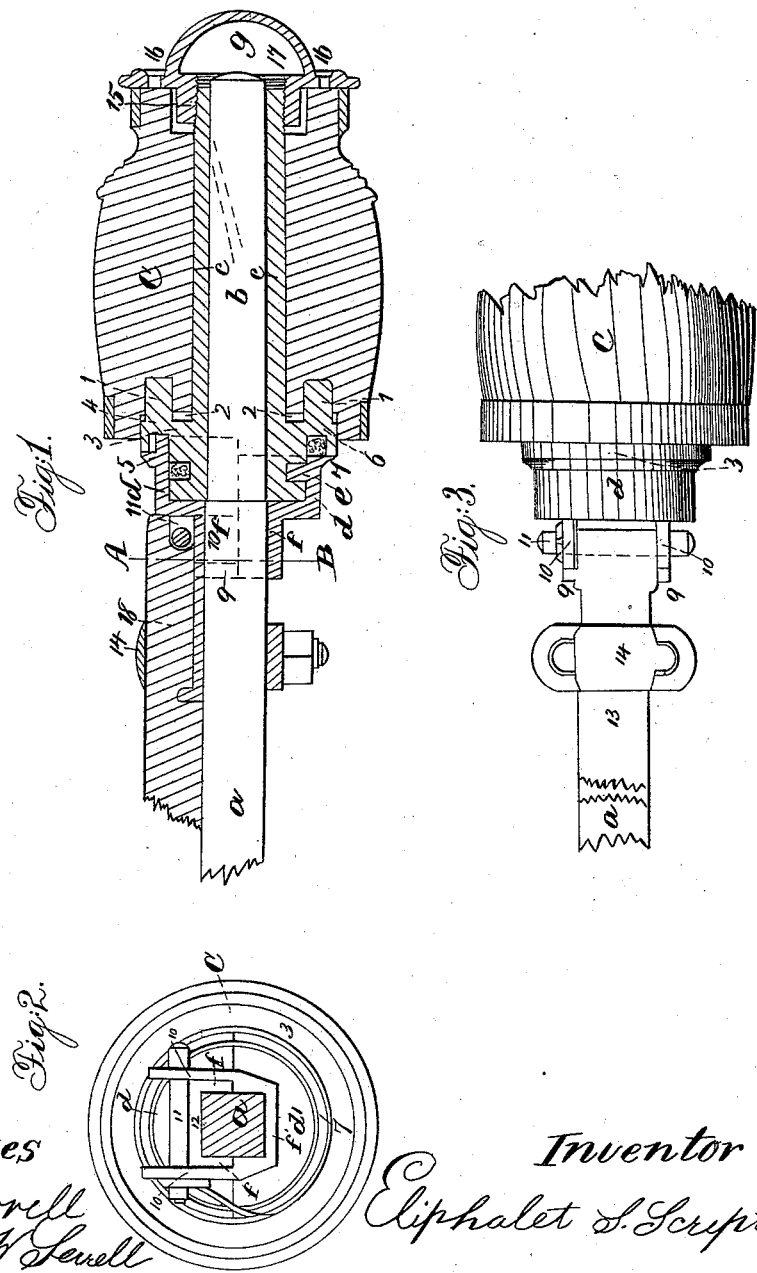
Witnesses
Inventor
Eliphalet S. Scripture

UNITED STATES PATENT OFFICE.

E. S. SCRIPTURE, OF GREEN POINT, NEW YORK.

CONNECTING HUBS WITH AXLES.

Specification of Letters Patent No. 7,535, dated July 30, 1850.

*To all whom it may concern:*

Be it known that I, ELIPHALET S. SCRIPTURE, of Green Point, Kings county, State of New York, machinist, have invented, made, and applied to use certain new and useful improvements in the means of connecting the axles, boxes, and wheels of carriages, such improvements effecting a strong and permanent attachment of the box at the inner end by means that at the same time keep out dust and dirt, for which improvements I seek Letters Patent of the United States, and that the following is a full and substantial description thereof, reference being had to the accompanying drawing, wherein—

Figure 1, is a vertical longitudinal section of the axle box, with the axle and axle bar in elevation, Fig. 2, is a cross section at the line A, B, of Fig. 1, and Fig. 3, is a plan of the attachments and inner end of the hub.

The like marks of reference apply to the same parts in all the figures.

$a$, is the axle bar made in any usual manner and turned at the ends to form a cylindrical or slightly tapering axle $b$, which enters the pipe or box $c$, this is surrounded by the hub $c$, into which it is driven and prevented from turning by pins $l$, $l$, on a flanch 3, that enters a rabbet in the hub, between which flanch and the hub a washer of india rubber 2, is introduced, the flanch 3, has on its edge a lip forming a concentric groove 4, which takes the end 5, of a semicircular or half box $d$, the other semicircle of the groove 4, is filled with a greased gasket 6, of any fit material, the inner end of the box $d$, is formed with a tongue 12, running along the top of the axle bar with the end turned up to receive the carriage spring or as shown in the drawing to take into the end of the wood axle tree with a forelock strap and nuts 14, which holds the parts together. The half box $d$ has also two flanches $f$, one on each side of the axle bar coming down half way of the bar, each having a lug 9, on its end to receive the ears 10, (shown also by dotted lines in Fig. 1,) connected by a flanch $f^1$, to the lower half box $d$, 1, and a pin or key 11, through the ears 10, above the tongue 12, secures the lower box $d$, 1, in place, this is formed with a flanch 7, and inside with a rib $e$, entering a groove around the end of the box $c$, and a greased gasket fills the remainder of the groove 8, above and within the upper half box $d$; a strip of leather or other equivalent substance put through a hole in the smaller end of the pin or key 11, and looped around it prevents that from working out and completes the attachment of the box $c$, to the axle.

On the end of the box $c$, is a male screw taking the female screw 15, on the inside of the cap $g$, which has holes 16 to turn it by, and an oil cavity 17; and near the end of the axle $b$, is a spiral groove so cut that the rotation of the hub and box shall screw the oil along to the back end of the axle. The effects of this construction are first that by the use of the elastic washer 2, the box $c$, is made to take a more even bearing and there is no rattling of the parts and the screw cap $g$, both holds the hub and box together and furnishes the means of easily replacing the box $c$, when worn out. Second the attachment of the axle to the hub are made without any screw threads or cuts into the axle so that it is not weakened. Third that the lip 5, on the upper half box $d$, entering the groove 4, keeps out all dust, and the rib $e$, entering the groove around the end of the box $c$, from below effectually keeps the hub from coming off, and the ears 10, and pin 11, keep the part together so that if the box $d$, is securely attached to the axle bar $a$, the hub cannot come off without breaking some of the parts the proportions and strength of which must be regulated by the duty to be performed. The boxes and ribs also prevent the necessity of a collar on the axle thereby saving much time and expense in the construction. The gaskets 6 and 8, keep in grease and lubricate the parts as they rotate so that the oil from the nose of the axle is not wasted by working out and dirtying the axle bar or axle tree and lastly that by simply removing the pin 11, and box $d$, 1, the wheel can be removed, thus furnishing a simple and effective attachment not known to have before been used.

What I claim as new and of my own invention and desire to secure by Letters Patent of the United States is—

The application of the half boxes $d$, and $d$, 1, with the semicircular lip 5, and rib $e$, constructed to enter the grooves 4 and 8, near the end of the axle $c$, said boxes being secured together and connected to the axle bar by any competent means and said ribs, grooves, and boxes operating as a substitute for a collar on the axle and to hold the axle bar and wheel on the axle and also to keep
5. dust out of the parts substantially as described and shown.

In witness whereof I have hereunto set my signature this thirteenth day of May, one thousand eight hundred and fifty.

ELIPHALET S. SCRIPTURE.

Witnesses:
 W. TERRELL,
 LEMUEL W. TERRELL.